United States Patent [19]
Fickelscher

[11] Patent Number: 4,969,376
[45] Date of Patent: Nov. 13, 1990

[54] PLANETARY DRIVE

[75] Inventor: Kurt G. Fickelscher, Frankenthal, Fed. Rep. of Germany

[73] Assignee: Renk Aktiengesellschaft, Augsburg, Fed. Rep. of Germany

[21] Appl. No.: 270,595

[22] Filed: Nov. 14, 1988

[30] Foreign Application Priority Data

Nov. 13, 1987 [DE] Fed. Rep. of Germany ....... 3738521

[51] Int. Cl.$^5$ .......................... F16H 1/28; F16H 55/00
[52] U.S. Cl. ........................................ 74/640; 74/46; 475/180
[58] Field of Search ................. 74/640, 804, 805, 411, 74/438, 460, 461, 462; 475/162, 180

[56] References Cited

U.S. PATENT DOCUMENTS

| 2,906,143 | 9/1959 | Musser | 74/640 |
|---|---|---|---|
| 2,930,254 | 3/1960 | Musser et al. | 74/640 |
| 3,147,640 | 9/1964 | Musser | 74/640 |
| 4,099,427 | 7/1978 | Fickelscher | 74/804 |
| 4,491,033 | 1/1985 | Carlson et al. | 74/640 |
| 4,545,263 | 10/1985 | Fickelscher | 74/640 |
| 4,625,582 | 12/1986 | Kiryu | 74/640 |
| 4,667,539 | 5/1987 | Fickelscher | 74/804 |

FOREIGN PATENT DOCUMENTS

| 2304003 | 10/1976 | France | 74/640 |
|---|---|---|---|
| 45-28656 | 9/1970 | Japan | 74/640 |
| 746144 | 7/1980 | U.S.S.R. | 74/640 |
| 912980 | 3/1982 | U.S.S.R. | 74/640 |
| 929916 | 5/1982 | U.S.S.R. | 74/640 |
| 1137269 | 1/1985 | U.S.S.R. | 74/640 |

OTHER PUBLICATIONS

C. W. Musser, "The Harmonic Drive", *Machine Design*, Apr. 1960.

Primary Examiner—Dwight Diehl
Attorney, Agent, or Firm—Foley & Lardner, Schwartz, Jeffery, Schwaab, Mack, Blumenthal & Evans

[57] ABSTRACT

A planetary drive containing two gear wheels with differing numbers of teeth and a radially flexible planetary wheel in engagement with these gear wheels. The planetary wheel has internal teeth and external teeth and is arranged at least partially in an annular gap between a hollow wheel and a sun wheel. The planetary wheel is forced by a cam element into the gaps between the teeth of the gear wheels in engagement zones. There are four engagement zones distributed around the circumference of the planetary wheel in which the teeth of the planetary wheel engage either the hollow wheel or the sun wheel. A roller bearing is provided between the cam element and the planetary wheel. The drive has a short axial structural length and a low manufacturing cost, assures uniform loading of the gear teeth, and enables the reduction ratio to be selectively predetermined throughout a large range.

9 Claims, 16 Drawing Sheets

Fig. 14
Fig. 15
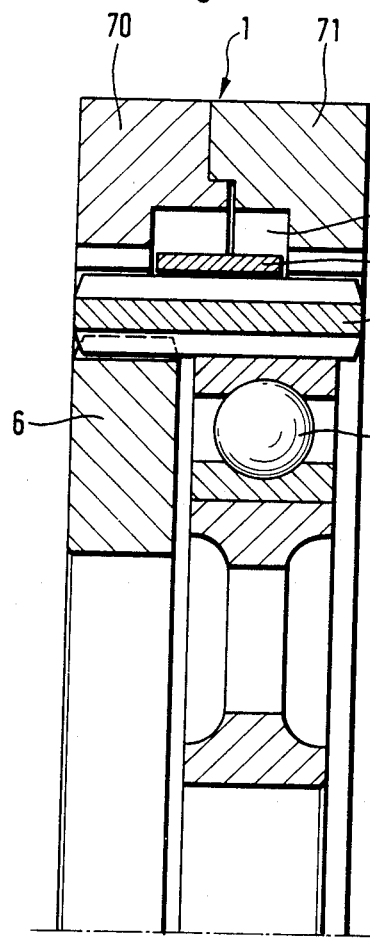
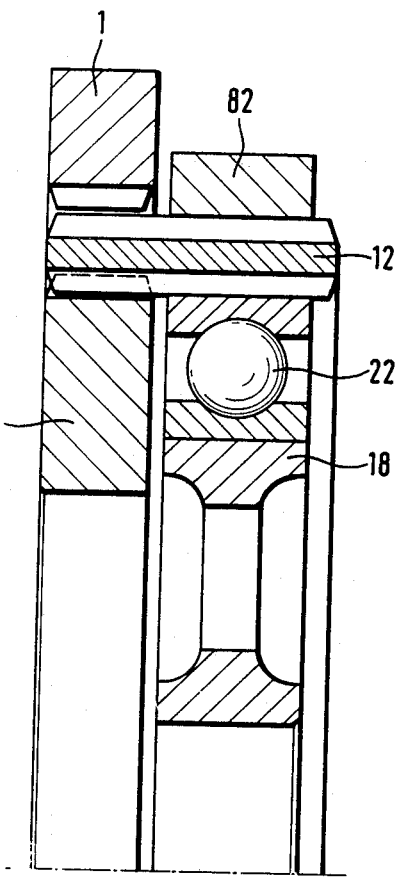

Fig. 16
Fig. 17
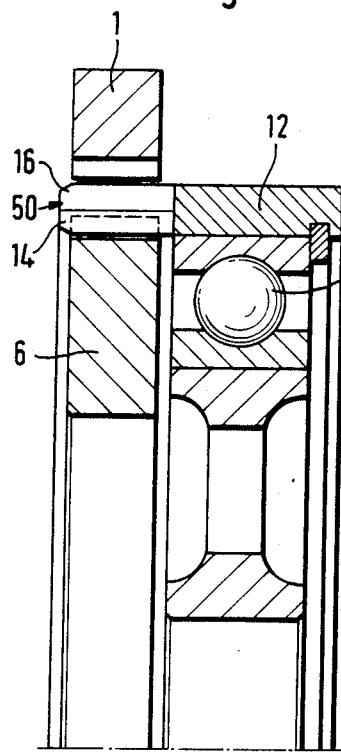
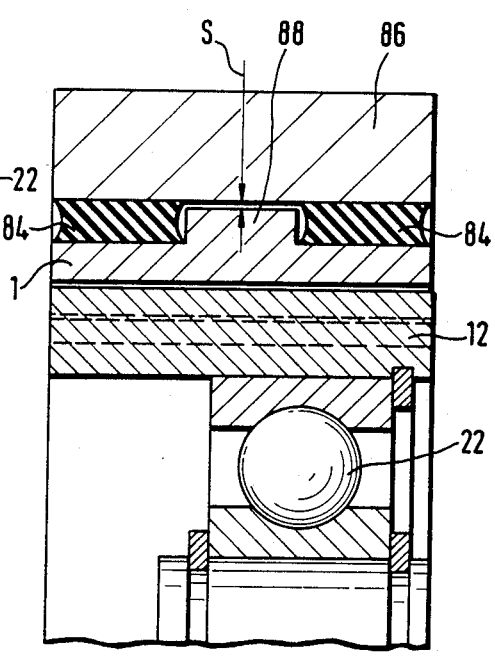

PLANETARY DRIVE

FIELD OF THE INVENTION

The present invention relates to a planetary drive comprising a sun wheel with external gear teeth for engaging mating teeth of a radially flexible planetary wheel, a hollow wheel with gear teeth for engaging teeth of the planetary wheel, and a rotatably mounted drive cam by means of which the planetary wheel is radially deformable through a roller bearing in such a way that its teeth are pressed into the teeth of the hollow wheel and of the sun wheel in different engagement zones.

BACKGROUND OF THE INVENTION

Planetary drives are coaxial drives which are primarily constructed as harmonic drives (hereinafter HD drives) or as sliding wedge drives (hereinafter GK drives). The basic construction of HD drives is known from the American Magazine, *Machine Design*. 1960, pages 160-173" which has an internally toothed hollow wheel and a substantially cylindrical, thin-walled, externally toothed planetary wheel, which is referred to as the "flexspline". With the same tooth distribution, the aforementioned flexible planetary wheel has two fewer teeth than the hollow wheel. The planetary wheel further is provided with internal teeth with which an externally toothed sun wheel engages. A cam is provided which is formed like an ellipse and acts upon the flexible planetary wheel through a correspondingly deformable roller bearing in such a way that directly opposite a number of the teeth of the planetary wheel engage with the teeth of the hollow wheel. The teeth of the planetary wheel are brought into engagement displaced at an angle with the sun wheel on the one hand and with the hollow wheel on the other hand by a drive cam. The drive cam is a component of the plate-form cam wheel which is arranged adjacent the sun wheel spaced axially at the side and acts one-sidedly. The forces act in axially-spaced planes, and above all, the planetary wheel is subjected to high stresses and requires a high manufacturing cost. The planetary wheel is deformed not only in the radial direction, but instead as a result of the axial spacing of the engagement planes of the gear wheels, additional stresses result which adversely affect the operating life and functional reliability of the drive mechanism. At the very least after a rotation of 45°, the teeth in each case come out of engagement, and due to the elliptical configuration of the drive cam, or generally of the rotating body, a rolling down or shifting off occurs in the region of engagement. The HD drive makes possible reductions in the meaningful range of $i=1:70$ to $i=1:300$. With decreasing reductions, the number of the supporting teeth becomes smaller, and consequently the transmissible torque also decreases. The degree of ovalization of the planetary wheel, i.e. the ratio of the diameter at maximum deformation compared to the diameter at zero deformation, is large. In addition, the high manufacturing cost required to achieve a structure in which there is little play is disadvantageous.

Further the HD drive may be constructed as a flat drive which is kinematically similar in construction and contains a second hollow wheel for supporting the rotational torque. This second hollow wheel has the same number of teeth as the flexible planetary wheel, whereby however, the distribution of the teeth is larger so that the rotational torque must be reduced. Due to the limitation of the reduction ratio at approximately $i=1:70$ and further to the high manufacturing cost required to achieve high precision, use of HD drives of this type has been limited to robots, machine tools, and the like.

The construction of a planetary drive referred to as a GK drive is disclosed in U.S. Pat. No. 4,099,427. Two wheels with internal or external gear teeth are arranged adjacent each other with respect to a common axis, whereby there is a difference $\Delta Z$ of from 2 to 4 in the number of teeth. Viewed in the axial direction, the teeth of the two gear wheels overlap so that so-called virtual tooth gaps are created, which move out of the teeth after a rotation of 180° when there is a difference of two in the number of teeth and after a rotation of 90° when there is a difference of 4 in the number of teeth. The tooth distribution and the flank angle thereby vary depending on the drive ratio and the depth of the teeth. A flexible planetary wheel engages radially in the virtual tooth gaps, whereby a flat contact exists at the flanks on both sides. In comparison with the initially described HD drives, additional degrees of freedom are provided with respect to the changes in tooth distribution and flank angle. The planetary wheel may be simply constructed in the form of a zig-zag formed, toothed band which accommodates itself to the changes of flank angle and tooth distribution. The toothed wheel and the planetary wheel each have a different tooth distribution. Further, an accommodation can take place by forming the teeth as bar teeth, pivotable teeth or bar teeth with a slight curvature. The teeth of the flexible planetary wheel force themselves into the virtual tooth gaps of the two axially adjacent gear wheels like wedges with flank contact on both sides, and indeed at a constant radial speed. The form of the rotating body or the drive cam is prescribed by semicircular sectors which are separated from the point of rotation by amounts $\Delta x$ and $\Delta y$. For large reductions, additional degrees of freedom of the flexible planetary wheel may be omitted; in a prescribed region of engagement an average tooth distribution and an average flank angle are prescribed. The number of teeth engaging with each other is substantially independent of the drive ratio and is determined by the selected degree of freedom so that up to 60% of the teeth may be in engagement with each other. With a GK drive, rotational torques can be transmitted which are many times greater than can be transmitted with other types of construction. Particularly with a tooth number difference of four, the GK drive is free of play so that no rolling movements occur to speak of.

As a result of the two-sided surface contact, the teeth of the planetary wheel must be decoupled when the direction of movement is reversed so that they do not have any two-sided surface contact, for example, in the direction of the Y axis. The theoretical load bearing capacity is thereby reduced, and high production tolerances are required to achieve high proportions of load bearing teeth, particularly with bar teeth. For a tooth number difference of four, reduction ratios up to $i=1:20$ can be achieved, whereby however, a comparatively large deformation of the flexible planetary wheel takes place. On the other hand, the GK drive permits reduction ratios up to $i=300$. Reduction ratios larger or smaller than the aforementioned values can be achieved by construction as a three plate drive with two independently driven, flexible planetary wheels. Further, disadvantages may arise with GK drives in that the teeth of the planetary wheel are subjected to shear stress in the center; also, due to deformations which occur primarily at high rotational moments, engagement disturbances may result therefrom.

Planetary drives of both of the described types further have the common disadvantage that an unavoidable micro-movement takes place in the region of cylindrical contact between the flexible planetary wheel and the outer diameter of the roller bearing. Due to phase compression and stretching as well as to play which cannot be entirely avoided, a slippage occurs in the aforementioned region which leads to dry friction. Abrasive wear can be avoided only by the highest quality surfaces. The HD drive has a large axial structural length, and the HD flat drive, for kinematic reasons, serves to transmit relatively small rotational moments. Both types require a high construction cost when they are built into production machinery, such as, for example, industrial robots, machine tools, or motor drives. This high construction expense for flanges, drive shafts, supplementary housings, and bearings adds additional mass, which in practice is larger by a factor of three to four than the mass of the planetary drive. The competitiveness of such drives in comparison to multishaft and multi-stage toothed spur wheel planetary drives is thereby adversely affected. This additional mass leads to significant difficulties, particularly in industrial robots which make rapid adjusting movements.

SUMMARY OF THE INVENTION

It is therefore the object of the invention to provide a planetary drive constructed in such a way that a compact construction and a course of movement with few disturbances are achieved. The cylindrical surfaces of the bearing between the drive cam and the planetary wheel should also be subjected to the most uniform possible loading so that roller bearings and needle bearings can be utilized. Kinematic disturbances at high rotational moments should be avoided, and a structure free of play should be assured. Further, the drive should make possible at a low manufacturing cost, reduction ratios from $i=1:15$ to $i=1:\text{infinity}$ without additional transmission elements. Furthermore, dry friction should be avoided between the flexible planetary wheel and the deformable bearing. The drive should exhibit a high functional reliability with a reduced ovalization, so that, in particular, material reversal stresses on the planetary wheel or generally on the toothed ring as well as on the bearing should be minimized with a simple construction. Finally, it should not be necessary during manufacture to observe any special, cost-intensive production tolerance requirements, and it should be possible to build the units into larger machines without substantial additional support structures.

These and other objects of the invention are achieved by providing a planetary drive comprising an externally toothed sun wheel; a toothed hollow wheel coaxial to the sun wheel; a radially flexible planetary wheel having internal teeth and external teeth and arranged at least partially in an annular gap between the hollow wheel and the sun wheel; a rotatably mounted cam element for radially deforming the planetary wheel in such a way that external teeth on the planetary wheel engage teeth on the hollow wheel and internal teeth on the planetary wheel engage teeth on the sun wheel in a plurality of engagement zones distributed around the circumference of the planetary wheel; and a roller bearing interposed between the cam element and the planetary wheel.

The planetary drive according to the invention is distinguished by an especially simple construction and requires only small amounts of space and a small mass. The flat tooth flanks of the sun wheel, of the planetary wheel, and of the hollow wheel make possible an acceleration-free radial displacement of the teeth of the planetary wheel. The main engagement zones of the hollow wheel and the spur wheel lie displaced by substantially 90° from each other so that a total of four corresponding opposed engagement regions are provided. In particular, arranged within the double-toothed planetary wheel are a preferably low-friction bearing as well as the drive cam in order to achieve radial displacement of the teeth substantially similar to the principle of the GK drive. Between the planetary wheel and the sun wheel as well as the hollow wheel, there is at least one tooth number difference $z=2$. In comparison to a GK drive having the same reduction ratio and load capacity, the ovalization of the planetary wheel is up to 50% smaller. Because of the substantially reduced ovalization or deformation of the planetary wheel as well as of the roller bearing, they are subjected to substantially less material reversal stresses, less change in tension, and less abrasion, so that the proposed drive is distinguished by high functional reliability and a long service life. Micro-rubbing between the planetary wheel and the roller bearing can be substantially avoided so that a costly surface treatment can be omitted. The planetary wheel can be manufactured at significantly reduced cost, and localized load peaks are reliably avoided. Relative movement between the sun wheel and the planetary wheel is achieved with a simple construction both of the planetary wheel and also of the sun wheel. A varying tooth number between the sun wheel and the planetary wheel is made possible in a functionally reliable manner. A modular drive structure, for example for the purpose of changing the reduction ratio, is made possible through interchange of the sun wheel. The reduced ovalization of the planetary wheel yields a high degree of overlap (coverage) and thus a significantly decreased loading of the individual teeth in comparison to prior planetary drives. The micro-movements between the roller bearing of the cam plate and the planetary wheel are reduced to a negligible value. The teeth of the planetary wheel are subjected to a significantly smaller radial displacement in comparison to previously known planetary drives. Through avoidance of high accelerations or delays, the tension values are decreased.

The planetary drive of the invention is further distinguished by a compact structure and a high functional reliability. The planetary drive is outstandingly suitable for manufacturing the various toothed wheels, including the planetary wheels, in a modular system. The desired reduction ratio is predetermined through suitable combinations with appropriate other wheels having different numbers of teeth, but otherwise having the same tooth geometry. Thus, for example, the reduction ratio can be varied by a desired factor by merely exchanging the sun wheel while retaining the hollow wheel and the planetary wheel. The teeth of the hollow wheel and the sun wheel are preferably arranged in the same radial plane, while the cam wheel or the cam plate is arranged axially adjacent one of these wheels, advantageously immediately adjacent the wheel. The drive bearing or roller bearing has substantially the same outer diameter as the sun wheel or the same inner diameter as the planetary wheel, and the planetary wheel overlaps axially both the roller bearing and also the axially adjacently arranged toothed wheel. There are two diametrically opposed engagement zones between the planetary wheel and the hollow wheel. Further, there are two likewise diametrically opposed engagement zones between the toothed ring or planetary wheel and the sun wheel, whereby, these engagement zones are displaced substantially 90° around the central axis with respect to the aforementioned engagement zones between the planetary wheel and the hollow wheel. The engagement zones are determined by the rotating body or cam wheel, which has corresponding cams or the like. The engagement zones with the hollow wheel and with the spur wheel may overlap circumferentially, which reliably assures that a high proportion of the teeth carry the load.

BRIEF DESCRIPTION OF DRAWINGS

Further features of the invention can be seen from the embodiments illustrated in the accompanying drawings in which:

FIG. 14 shows an embodiment similar to FIG. 1, but having a resilient ring around the planetary wheel;

FIG. 15 shows an embodiment with an external ring;

FIG. 16 shows an embodiment similar to FIG. 11;

FIG. 17 shows an embodiment similar to FIG. 1 but having a flexibly arranged hollow wheel;

DETAILED DESCRIPTION OF PREFERRED EMBODIMENTS

Figure 1:
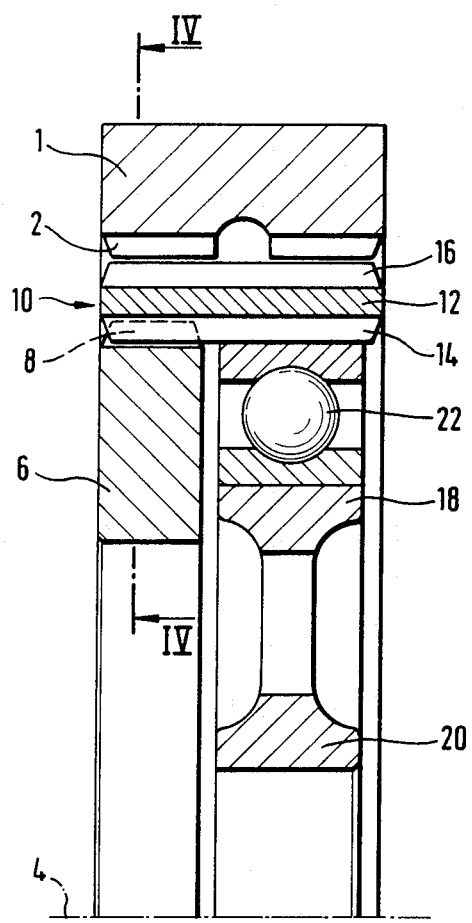
FIG. 1 is an axial sectional view through a drive according to the present invention.

FIG. 1 shows a planetary drive in axial section with a hollow wheel 1 which has internal teeth 2. Coaxial to hollow wheel 1 is a sun wheel or spur wheel 6 with external teeth 8 arranged to rotate about a common central axis 4. Radially between the hollow wheel 1 the sun wheel 6 there is an annular gap 10 in which a planetary wheel 12, which is flexible in the radial direction, with internal teeth 14 and external teeth 16 is arranged. Axially directly adjacent the sun wheel 6 is a rotatable body 20 which has a drive cam 18 and which supports the planetary wheel 12 through a radially outwardly positioned roller bearing 22. The hollow wheel 1 and/or the planetary wheel 12 overlap the preferably radially inwardly arranged sun wheel 6, the drive cam 18 and the roller bearing 22. As explained hereinafter, a total of four engagement zones distributed around the circumference are provided in which the planetary wheel 12 is in engagement with the hollow wheel 1 and the sun wheel 6. FIG. 1 shows one engagement region between planetary wheel 12 and sun wheel 6, in which the internal teeth 14 of the planetary wheel engage the external teeth 8 of the sun wheel. In this location the external teeth 16 of the flexible planetary wheel 12 are out of engagement with the internal teeth 2 of hollow wheel 1. A corresponding relationship exists in the location displaced 180° around the central axis. In contrast thereto, in the locations displaced 90° and 270° around the central axis from the illustrated position, the two other engagement regions are defined in which the external teeth 16 of the planetary wheel engage the internal teeth 2 of the hollow wheel, and the internal teeth 14 are thereby out of engagement with the external teeth 8 of spur wheel 6. The regions of engagement are determined by means of the rotatable body 20 through the diametrically opposed drive cams 18 and through the roller bearing 22 of the planetary wheel 12.

Figure 2:
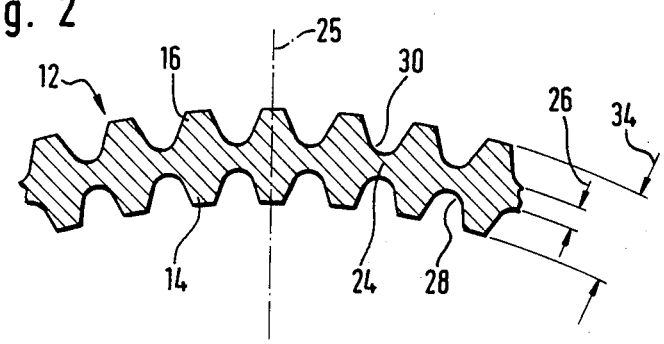
FIG. 2 is a radial sectional view through the flexible planetary wheel.

FIG. 2 shows in partial radial sectional view of the planetary wheel 12 which is flexible in the radial direction and which, in accordance with the invention, has a high bending modulus of elasticity in the circumferential direction. The internal teeth 14 and external teeth 16 of planetary wheel 12 are arranged in this embodiment of the invention in the same axial plane 25. Because of the radially opposed teeth, a high surface moment of inertia of the drive elements is achieved, and in addition a good flexibility of the planetary wheel 12 in the radial direction is reliably assured by the connecting webs 24. The thickness 26 of the connecting webs 24 measured in the radial direction is predetermined in accordance with requirements, whereby the strength requirements are optimally met by the radii 28, 30 formed on both sides.

Figure 3:
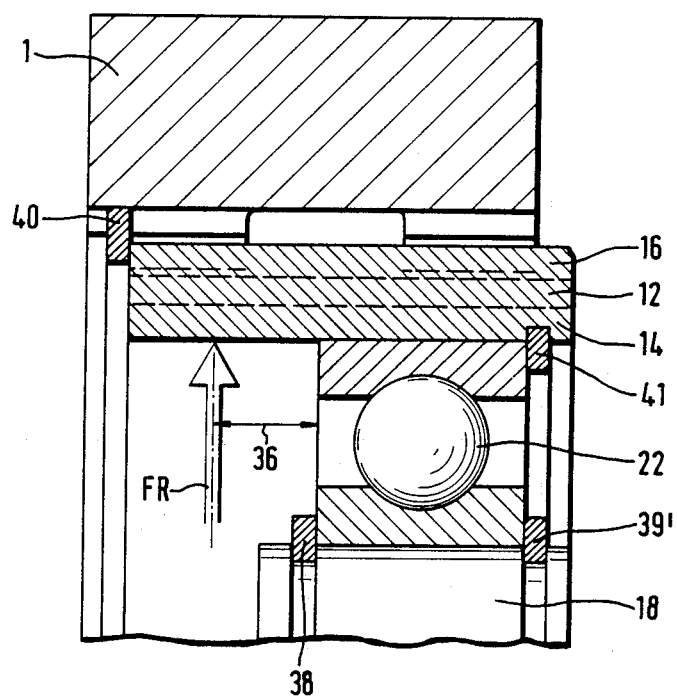
FIG. 3 is an enlarged axial sectional view similar to FIG. 1.

In FIG. 3 an enlarged axial section of a further embodiment is illustrated, whereby the sun wheel is not shown. The force effects of the spur wheel due to primarily radial force are indicated by the arrow FR. As follows from the subsequent description, the proportion of load-bearing teeth in each engagement region is large, and consequently the bending stress on the individual teeth is very small. In addition, a supplemental reinforcement of rigidity in the circumferential direction of the flexible planetary wheel is achieved as a result of the total of four load engagement regions.

Due to the large total height 34 of the respective teeth of the internal teeth 14 and the external teeth 16, the resistance moment of the planetary wheel 12 is very large, whereby the drive or roller bearing 22 as well as the drive cam can be arranged outside the direction of action of force FR. The axial spacing 36 between the plane of action of the force FR and the roller bearing 22 can be kept small so that the shear forces are larger in the required way than the bending forces. The inner bearing ring of roller bearing 22 is fixed axially on the drive cam 18 by means of resilient rings 38, 39'. The axial securing of the planetary wheel 12 with respect to the hollow wheel 1 and the roller bearing 22 is effected by means of securing rings or resilient rings 40, 41.

Figure 4:
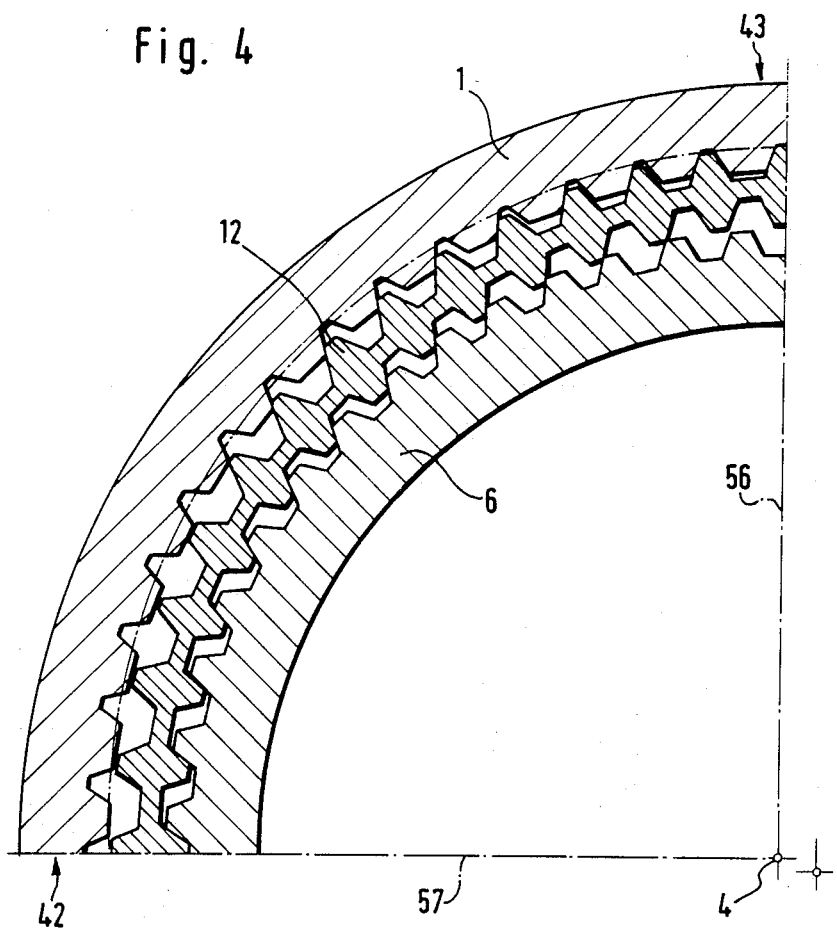
FIG. 4 is a sectional view taken along section line IV—IV of FIG. 1.

FIG. 4 shows a radial sectional view taken along section line IV—IV of FIG. 1 wherein two engagement zones 42, 43 displaced 90° around central axis 4 with respect to each other can be seen. At the lower left is engagement zone 42, and at the upper right is engagement zone 43. The engagement zones 42 and 43 each extend over a relatively large angular range so that a high proportion of the teeth of planetary wheel 12 are always in engagement with the associated teeth of hollow wheel 1 or spur wheel 6. The bending stress per tooth is consequently very small.

The planetary drive contains, similar to the initially described sliding wedge (GK) drive, arcuately configured toothed wheels in engagement with each other without teeth capable of rolling, i.e. curved teeth, being required therefor. With this drive, a kinematic uniformity is achieved, whereby in addition a low degree of play and noise is also achieved with practically no Hertzian pressure. The drive with the two internally toothed and externally toothed wheels arranged within each other, namely hollow wheel 1 and sun wheel 6, improves the flat surface sliding contact, whereby a change of the flank angle surprisingly is avoided and an elastic accommodation of the changes in distribution is reliably achieved. The important kinematic and geometric relationships are explained more completely hereinafter.

Figure 5:
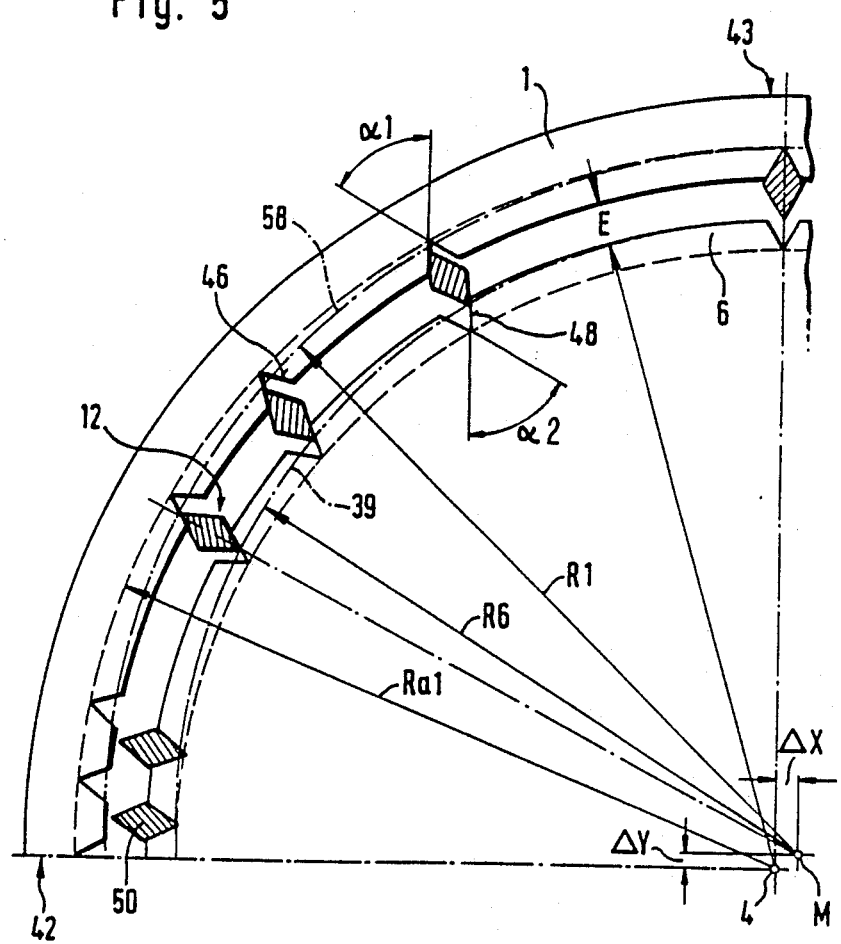
FIGS. 5-9 are illustrations to clarify the kinematic and geometric relationships of the drive.

FIG. 5 schematically illustrates a drive with a reduction ratio $i=1:30$. Only individual teeth and tooth gaps in especially important positions are illustrated. The hollow wheel 1 contains 60 teeth, the planetary wheel 12 contains 58 teeth, the sun wheel 6 contains 58 teeth, so that the reduction ratio is $i=1:30$. The hollow wheel 1 with tooth gaps 46 and the sun wheel 6 are coaxial to the central axis 4. In the engagement zones 42, 43 a radial displacement occurs on the radial vectors F of the respective individual complete teeth 50 of the planetary wheel 12 with a constant speed along a predetermined curve, the center M of which for the quadrant shown here lies outside the quadrant, displaced from the central axis 4 by the amounts $\Delta x$ and $\Delta y$. For the three other quadrants, the centers of the respective radial vectors are determined in accordance with the thusly predetermined curve. The radial vector curve 58, along which the peaks of the external teeth of planetary wheel 12 move, is described by the radius R1, and the radius vector curve 39 along which the peaks of the internal teeth of the planetary wheel move, is described by radius R6, and indeed around the common center point M. In this way it is assured that the radial speed of the respective teeth 50 engaging with hollow wheel 1 is identical to the radial speed of the respective teeth engaging with the sun wheel 6. The flank angles $\alpha 1$, $\alpha 2$ remain constant while the tooth distribution changes along the radial vector curve. The accommodation of the teeth 50 of the flexible planetary wheel to the variable distribution is described with reference to FIG. 9. The diameters of hollow wheel 1 and sun wheel 6 are selected, and if necessary corrected, such that a gap E arises which is larger than half the tooth height, and the teeth 50 can change tooth gaps without interference.

Figure 6:
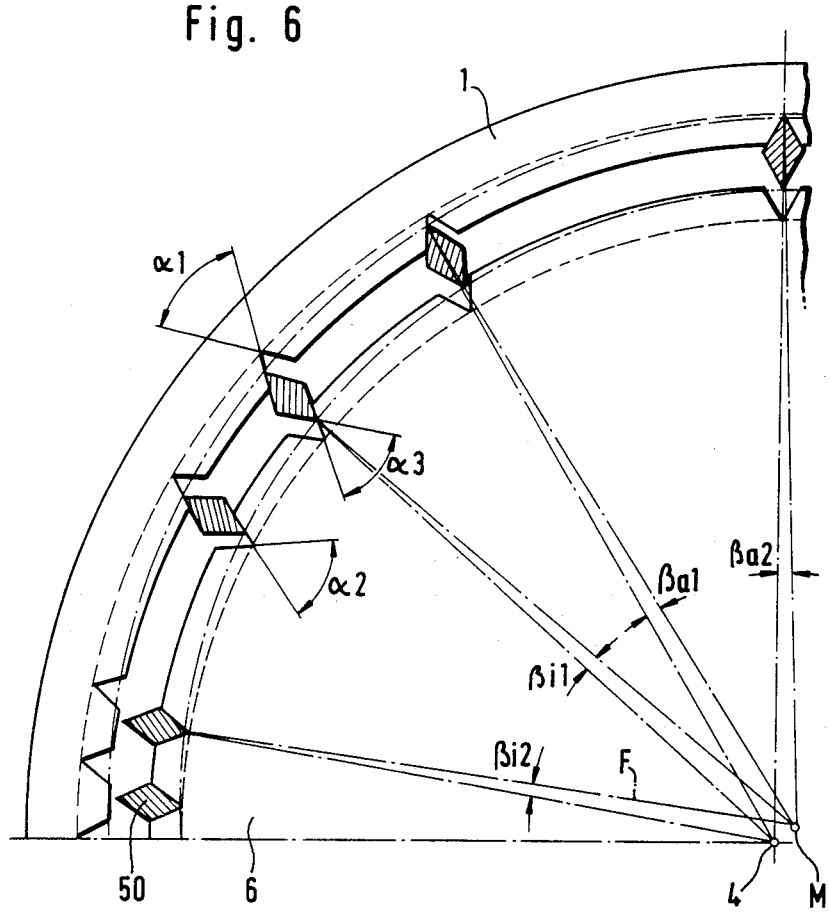

FIG. 6 corresponds substantially to FIG. 5, whereby however, for clarity of illustration, the individual reference numerals have been omitted and the insertion angles $\beta i$, $\beta a$ are more particularly identified. The radial vector F is displaced with respect to an axial plane extending through the central axis 4 around the respective insertion angle $\beta i$ or $\beta a$. A radial sliding of the teeth 50 on the respectively engaged tooth flanks of hollow wheel 1 or of sun wheel 6 takes place in an advantageous manner without occurrence of a rolling movement. The value of the insertion angles $\beta i$, $\beta a$ as well as their change become smaller as the reduction ratio increases. The optimum flank angle $\alpha 3$ of the teeth of the flexible planetary wheel is larger than the angle $\alpha 1$ of the hollow wheel or $\alpha 2$ of the sun wheel by an amount equal to twice the value of the angle $\beta a$ or $\beta i$. At reductions lower than $i=1:40$ the teeth of the flexible planetary wheel may be configured with a slightly evolute curvature. At reductions above $i=1:40$, as a result of the deviations lying within manufacturing tolerances, the flank angle $\alpha 3$ can be constructed the same size as the aforementioned gap angles $\alpha 1$ and $\alpha 2$.

Figure 7:
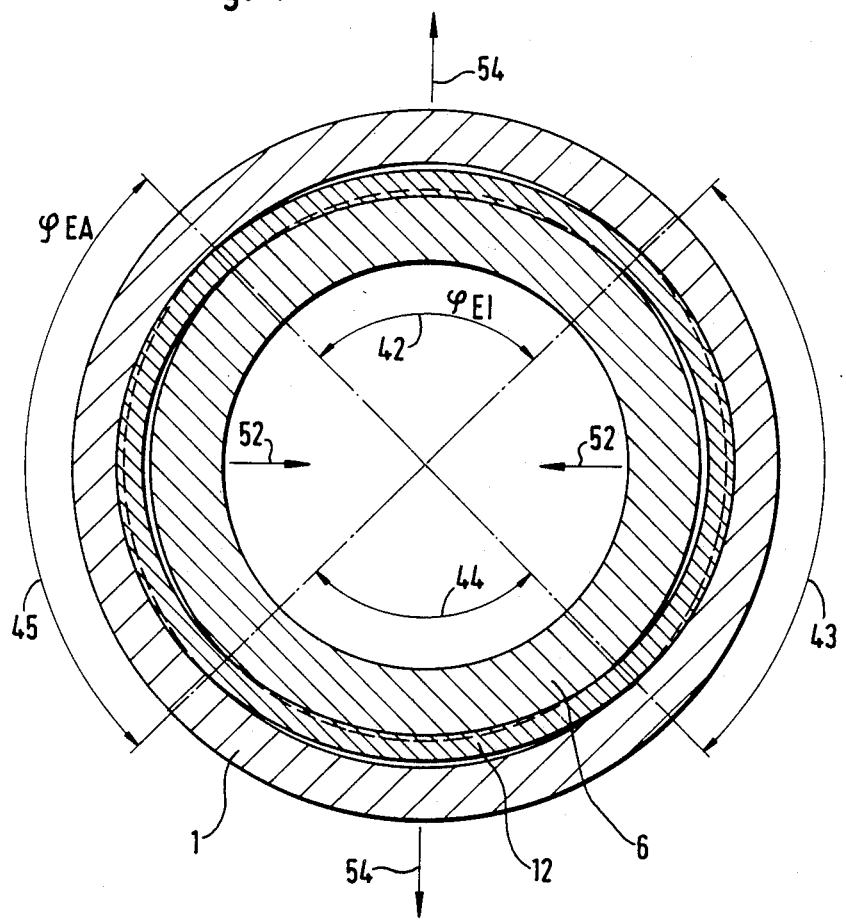

In FIG. 7, the positions of the total of four engagement zones 42–45 are illustrated schematically, whereby the outer engagement zones 43, 45 in the hollow wheel are identified by the angle $\gamma EA$ and the inner engagement zones 42, 44 are identified by the angle $\gamma EI$. For reasons of clarity of illustration, the engagement zones 42–45 are each depicted 90° in size; however in practice there is a substantial overlap due to the continuous transition as can be seen directly from the drawing. The restoring forces directed inwardly from the hollow wheel 1 on the planetary wheel 12 are represented by arrows 52, and the forces directed outwardly from the sun wheel 6 on the planetary wheel are represented by arrows 54. The flexible planetary wheel 12 is very rigid in the circumferential direction. A stiffening effect against axial bending of the teeth is provided by those teeth which with their opposing flanks simultaneously engage on one side with the hollow wheel 1 and on the other side with the sun wheel 6, so that the bending forces oppose and substantially cancel each other.

Figure 8:
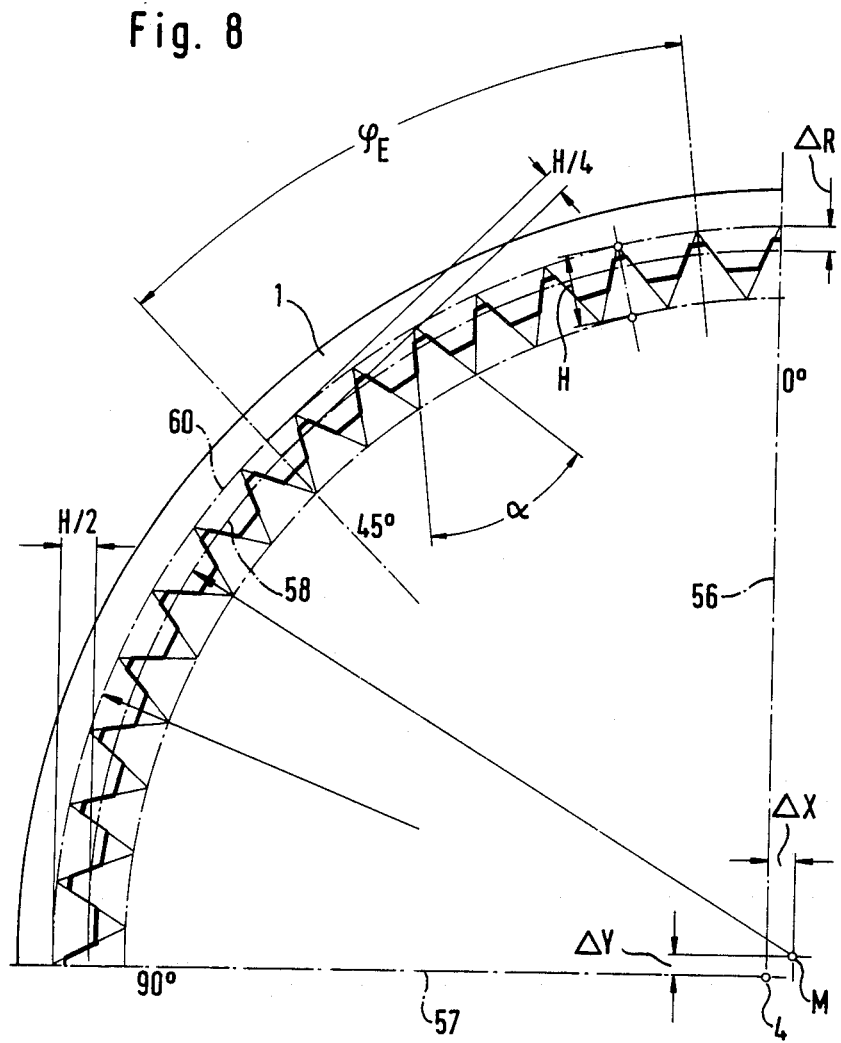

In FIG. 8, the internally toothed hollow wheel 1 is illustrated to explain the tooth geometry. Taking into account the flank angle $\alpha$, the number of teeth and a predetermined inner diameter, the tooth height H and the outer diameter are calculated. In a sliding wedge drive, which has two hollow wheels lying axially adjacent each other, so-called virtual tooth gaps are provided which for a tooth number difference of two move out of the row of teeth at 180°. In the planetary drive with respective, diametrically opposite engagement regions, however, the teeth of the planetary wheel must already have exited from the hollow wheel or the sun wheel after a rotation through 90°. Therefore corrections are contemplated in the diameter of the flexible planetary wheel as well as the drive cam. For the planetary drive, a constant radial tooth displacement with a constant speed is prescribed, whereby the center M of the radius vector curve is displaced with respect to the central axis 4 in the manner shown. It is hereby assumed that in the plane 56 the teeth of the planetary wheel engage completely in the triangular-form internal teeth of the hollow wheel 1, and after 45° displacement from plane 56, the spacing between the radius vector curve 58 and the peak curve 60 has the value H/4. After 90° displacement the spacing has the value H/2. In order to move freely in the plane 57 after a 90° rotation with reference to the plane 56, the inner diameter of the hollow wheel is correspondingly enlarged by an amount and the outer diameter of the flexible planetary wheel is decreased by an amount so that each entering or departing tooth can quickly complete the switch from the one tooth gap into another. Through this significant feature it becomes possible that up to 90% of the teeth are in increasing surface contact with each other. It is also significant that, in comparison with a GK drive or an HD drive, the ovalization of the planetary wheel has only approximately one-half the value. The planetary drive has trapezoidalform teeth.

Figure 9:
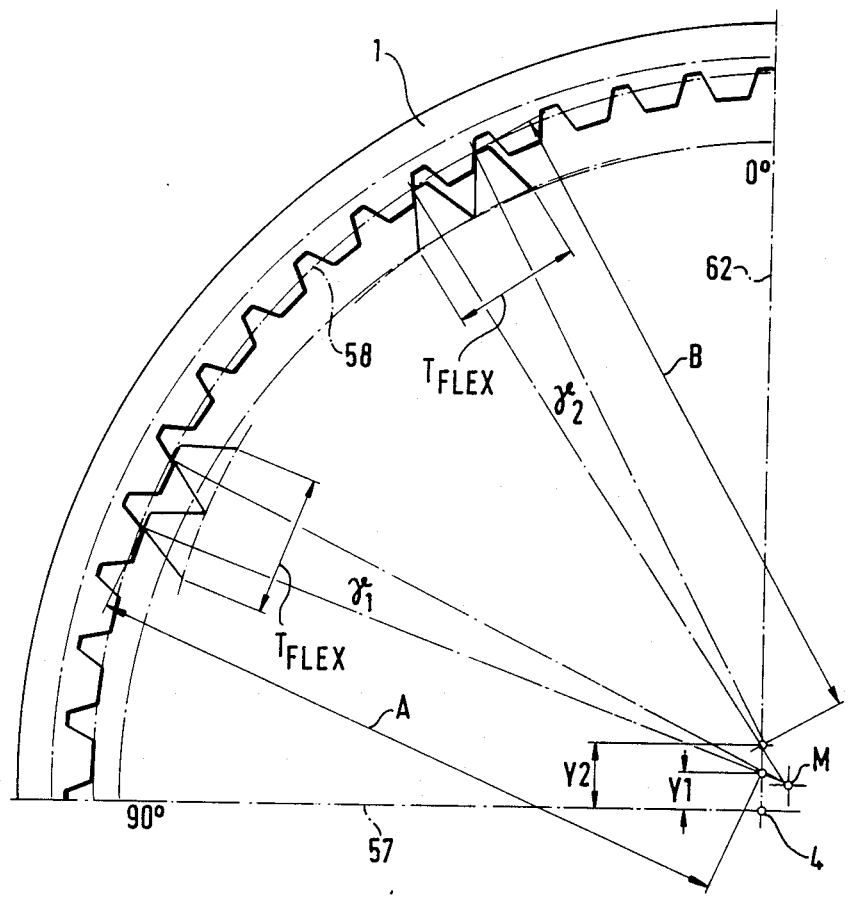

The accommodation of the flexible planetary wheel to various tooth distributions in the engagement region is explained with reference to FIG. 9. The intersection of the radius vector curve 58 with the tooth flanks yields distribution differences in the engagement region which, however, are very small. Self-accommodation without appreciable stress takes place in that the relative curvature range of the radius vector curve 58 with respect to the main axis 4 generates points of intersection Y1 and Y2, for which differing radii A and B are given. Since at the foot of the tooth of the planetary wheel the curvature remains constant and the angle $\gamma 1$ increases in size to $\gamma 2$, the points of the teeth move away from each other. By adjusting the tooth angle, the engagement zone and the tooth height, an accommodation to the change in distribution takes place without appreciable additional loads arising thereby. The inner diameter and the outer diameter of hollow wheel 1 and sun wheel 6 are corrected for the purpose of reducing ovalization and/or the material reversal stress of the flexible planetary wheel as well as the roller bearing. The radial vector curve 58 at the point of intersection with plane 57 is substantially equal in size to the inner diameter of the hollow wheel; a similar relationship applies to the outer diameter of the spur wheel. The tooth peaks of the teeth of the planetary wheel and/or of hollow wheel 1 and/or of spur wheel 6 are flattened and exhibit a trapezoidal-form cross section.

Figure 10:
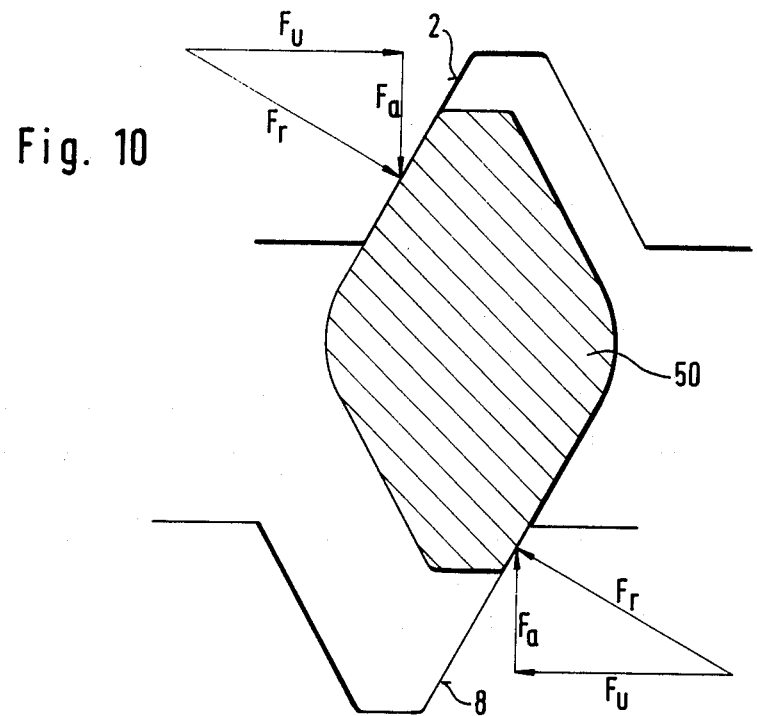
FIG. 10 is an illustration of the forces acting on an individual tooth of the planetary wheel.

FIG. 10 shows an enlarged, solidly formed individual tooth 50 which is in contact with the internal teeth 2 of hollow wheel 1 and with the external teeth 8 of the spur wheel 6. The forces Fu acting in the circumferential direction and the forces Fa acting in the radial direction are shown in the drawing. The resultant forces Fr in this case primarily produce a torsional load on the individual tooth 50.

Figure 11:
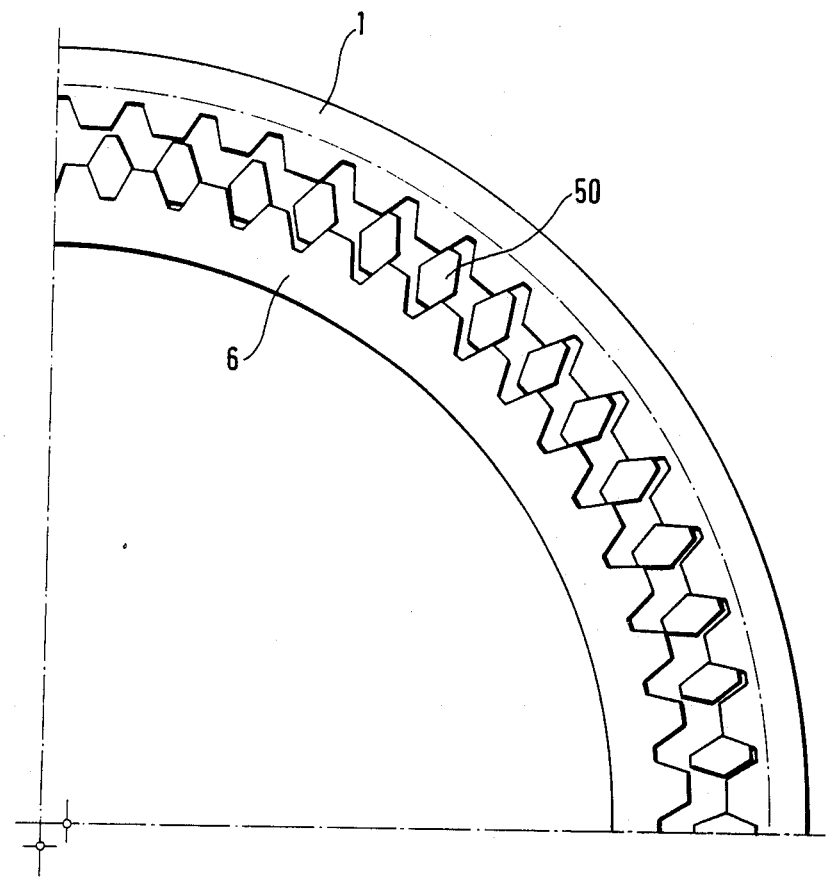
FIG. 11 is a radial sectional view through an embodiment in which the planetary wheel comprises axially projecting teeth which are connected with each other by webs (not shown)

FIG. 11 shows an embodiment similar to that according to FIG. 4, whereby however, no connecting webs are shown between the complete teeth in the vicinity of the spur wheel 6. In contrast thereto, in the vicinity of the drive cam the teeth are connected with each other just as in the embodiment of FIG. 4. The individual teeth 50 are produced in the flexible planetary wheel, in particular by removal of some of the material from one of its face surfaces. Therefore any unevenness which may occur can be equalized, or larger manufacturing tolerances can be permitted.

Figure 12:
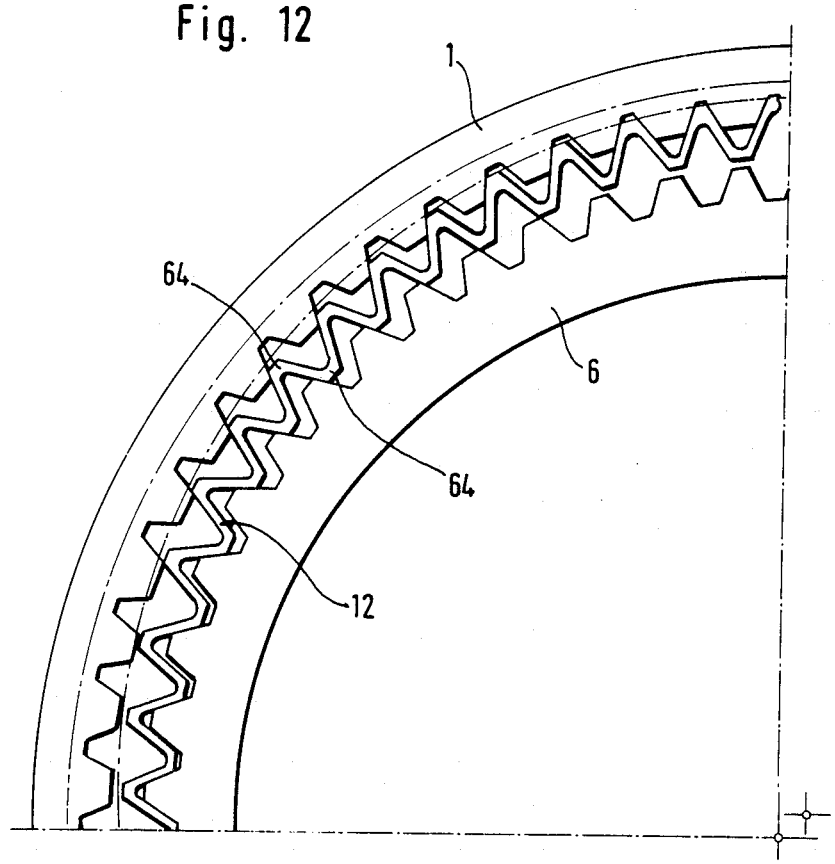
FIG. 12 illustrates an embodiment in which the planetary wheel has a construction which is flexible both in the radial direction and also in the circumferential direction.

In FIG. 12, a particular embodiment is illustrated having a toothed ring or planetary wheel 12 which is also flexible in the circumferential direction. The difference in number of teeth of the hollow wheel 1 compared to the planetary wheel 12 is at the most +2 while the planetary wheel 12 has a difference of −2 in comparison with the sun wheel 6. The total difference in number of teeth is 4, so that a halving of the reduction can take place without the kinematic geometry of the drive being changed. By exchanging the hollow wheel 1 or the spur wheel 6, which then has same number of teeth as the planetary wheel 12, the reduction can be changed, for example from i=1:30 to i=1:15, in an especially simple manner. Further, in this embodiment with the toothed ring which is also flexible in the circumferential direction, an accommodation to the change in distribution explained above with reference to FIG. 9 is achieved. Finally, due to the high number of load bearing teeth as well as the parallel guiding of the teeth, the width of the hollow wheel, and similarly that of the spur wheel, can be kept very small.

Figure 13:
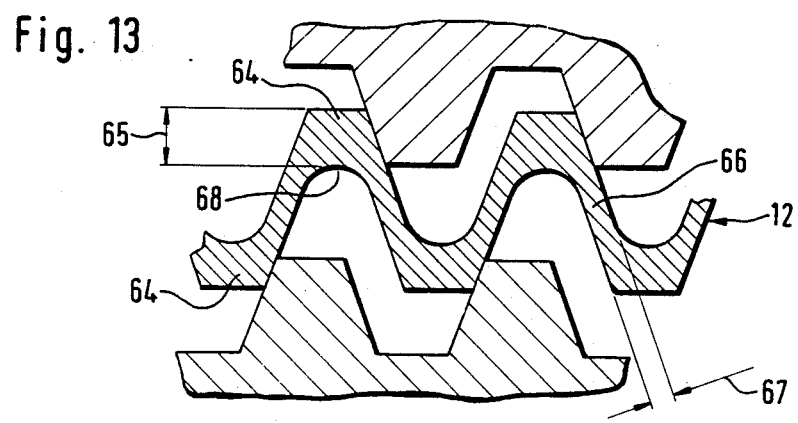
FIG. 13 is an enlarged partial section view similar to FIG. 12.

FIG. 13 is an enlarged illustration of the planetary wheel 12 which also is flexible in the circumferential direction and in which the heads 64 of the teeth having the radial height 65 are relatively stiffly constructed. The flexibility is achieved through the regions 66 which are provided between the heads 64 of the outer and inner teeth, which have the thickness 65 and which transition in each case into the heads 64 of the teeth through inner rounded sections 68. When ovalized by means of the drive cam, this particular embodiment produces almost no restoring forces, and when load is applied, it exhibits an extraordinarily high rigidity. The height 65 of the teeth here is at least twice as large as the thickness 67 of the web 66.

In accordance with FIG. 14, the hollow wheel 1 comprises two parts 70, 71 which are connected with each so as to rotate together. In contrast to the embodiment of FIG. 1, the hollow wheel 1 has a cutout recess 72 in the center. Within this recess 72, a thin-walled, smooth ring 74 is pushed onto the planetary wheel with little play. This ring 74 substantially takes up the tensile forces acting on the planetary wheel 12 and increases the bending stiffness of the planetary wheel. The thin-walled ring 74 has good flexibility in the radial direction.

In FIG. 15, an embodiment is shown in which the planetary wheel 12 is extended axially beyond the hollow wheel and the spur wheel 6. A ring 82 is arranged radially outwardly around the planetary wheel 12 in the vicinity of the drive cam 18 and of the roller bearing 22. This ring 82 serves to take up tensile forces and bending forces.

FIG. 16 shows an embodiment which has the roller bearing 22 in the lower tooth region of the planetary wheel 12. The gap between the hollow wheel 1 and the spur wheel 6 is smaller than in the embodiment with webbed teeth. Further, a roller bearing, for example a ball bearing, is supported directly on the cylindrical bearing of the flexible planetary wheel 12. As in FIG. 11, individual teeth 50 are spaced axially from the cylindrical part of the wheel 12.

FIG. 17 shows an embodiment in which the sun wheel is not shown. The hollow wheel 1 is likewise hereby flexibly constructed in the circumferential direction and connected by means of elastic elements 84 to a solid ring 86. In particular, the elastic elements 84 are constructed as rubber rings by means of which the hollow wheel 1 is vulcanized into the solid ring 86. The hollow wheel 1 has a strap or bar 88 in the middle which serves to limit the ovalization under load. This embodiment is further distinguished in that the inner diameter of the teeth can be kept somewhat smaller whereby free play and also a biasing toward the flexible toothed ring or planetary wheel 12 is assured. The ovalization takes place through the planetary wheel 12, whereby about 10% of the magnitude of the ovalization of the toothed rings is sufficient which can be absorbed without any difficulty by the rubber ring. This embodiment additionally has the significant advantage that impacts are damped by the elements 84, and the drive is distinguished altogether by an extraordinarily low noise level.

Figure 18:
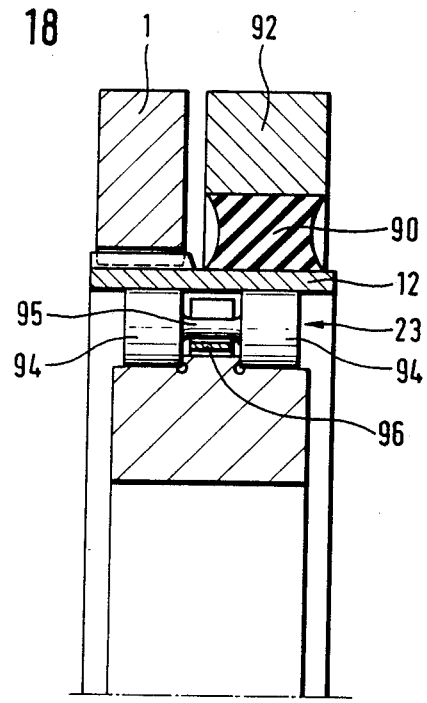
FIG. 18 is a longitudinal sectional view through an embodiment having an elastic connection between the planetary wheel and a ring.

FIG. 18 shows an embodiment of a drive in which the planetary wheel 12 is connected to a toothless ring 92 through a preferably ring-form elastic element 90. In this case also, the attachment of the elastic element 90 to the planetary wheel 12 and the outer ring 92 is effected by vulcanization. The elastic element 90 is elastic both in the longitudinal direction and also in the circumferential direction. To avoid bending forces, a roller bearing 23 is also provided on the planetary wheel in the area inside the elastic ring 90, which roller bearing naturally is loaded only by comparatively small restoring forces of the elastic element 90. The roller bearing 23 comprises double rollers 94 connected in the center by shaft or pin 95. To guide the rollers, a cage 96 is provided in the area of the pins 95.

Figure 19:
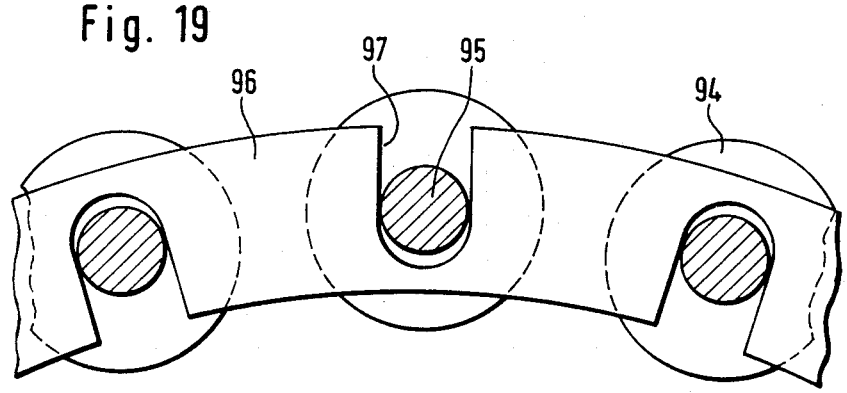
FIG. 19 shows a preferred bearing cage arrangement.

FIG. 19 shows an enlarged view of a portion of the roller bearing 23 according to FIG. 18. The bearing cage 96 has alternating radially inwardly and radially outwardly open slots 97 in which the connecting pins 95 of double rollers 94 are inserted. In this particular embodiment, the rollers 94 can move unhindered in the radial direction without the cage 96 being deformed in addition.

Figure 20:
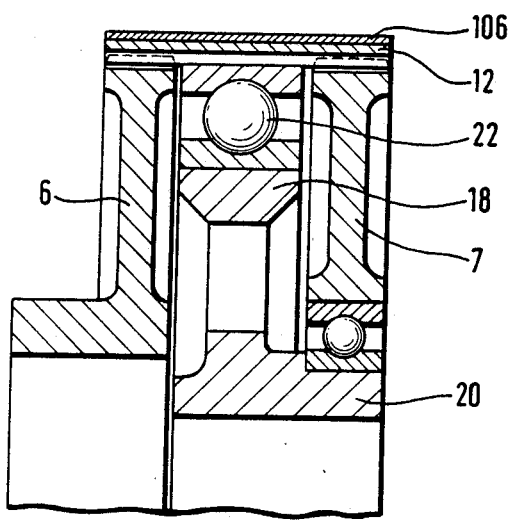
FIG. 20 shows an embodiment with two spur wheels.

FIG. 20 shows an embodiment with two sun wheels 6, 7 which have differing external teeth, in which the radially outwardly positioned planetary wheel 12 can engage with its teeth. The planetary wheel 12 is surrounded externally by a thin-walled resilient ring 106 which serves primarily to take up tensile stresses. The rotatable body 20 with the drive cams 18 is arranged axially between the sun wheel 6 and the sun wheel 7, which are constructed as plates. The roller bearing 22 also is located axially between the sun wheels 6, 7. This embodiment is distinguished by an especially small outer diameter.

Figure 21:
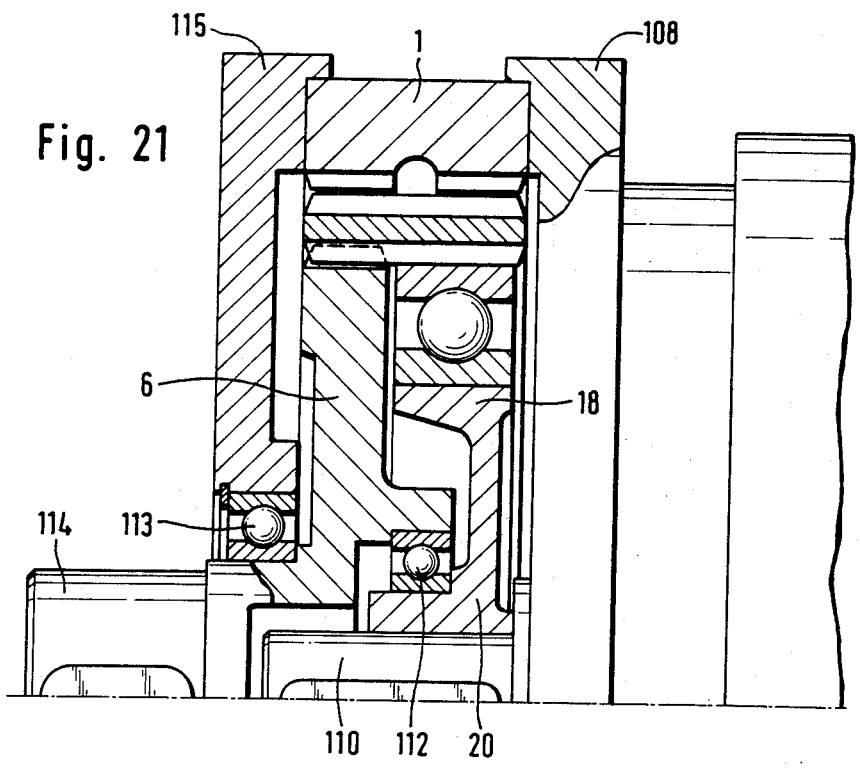
FIG. 21 shows a particular embodiment in conjunction with a drive motor.

FIG. 21 shows an arrangement connected with a drive motor. The hollow wheel 1 is flanged directly to motor 108, while rotatable body 20 with drive cam 18 is coupled to the motor shaft 110 with a fitted spring. The spur wheel 6 is supported on the motor shaft 110 through a bearing 112. A housing cover 115 is screwed onto the motor housing 108 over the hollow wheel 1 and is provided with a further, radially inner bearing 113 in which the spur wheel 6 is mounted together with a trunion shaft 114 which is connected thereto. The housing cover 115 is the only additional structural component. In this arrangement, the original length predetermined by the motor shaft 110 is only extended by the drive in an amount corresponding to the length of trunion shaft 114. This motor drive is therefore distinguished by an exceptionally compact construction.

Figure 22:
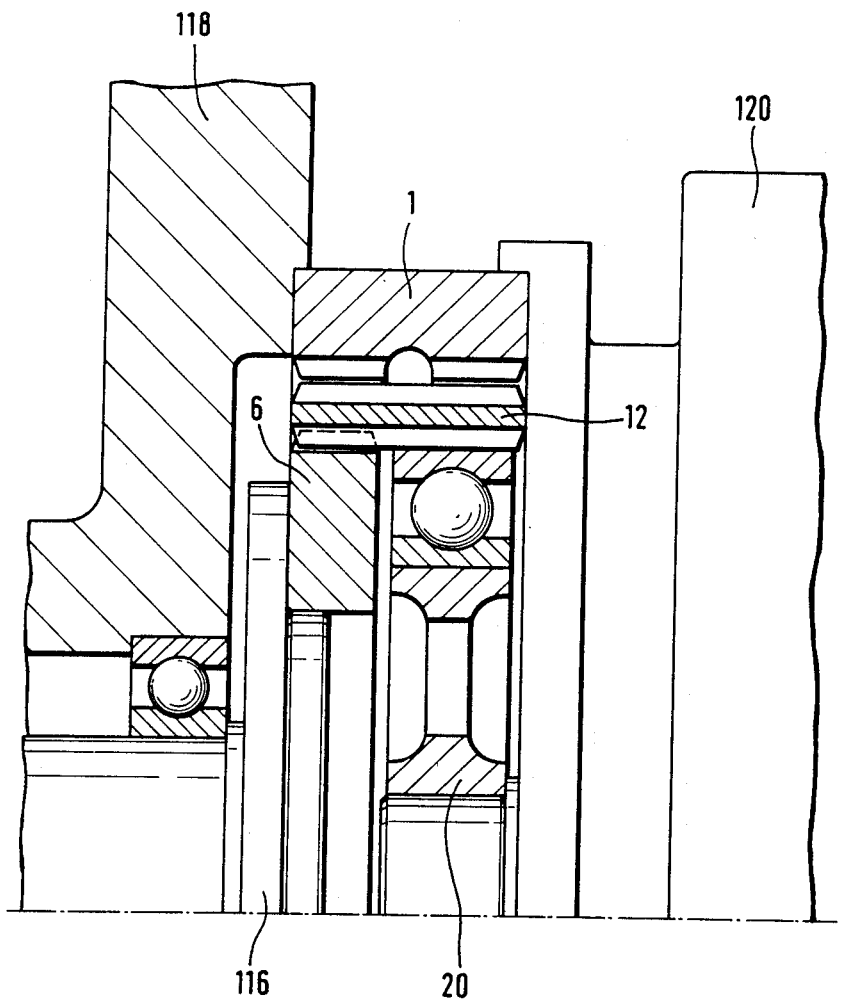
FIG. 22 a particular example of how the drive can be built into an industrial robot.

In FIG. 22, an arrangement of the drive explained with reference to FIG. 1 for an industrial robot is shown. The mounting of the spur wheel 6 takes place through a shaft 116 in housing portion 118 of the robot. The drive motor 120 is flanged directly onto the hollow wheel 1 and is likewise screwed onto the housing 118. In this embodiment, no additional massive parts are required for mounting the drive. A possible significant reduction in the total mass of the drive is especially advantageous in view of the rapid pivoting movements executed by the robot and the acceleration forces which thereby arise.

The possible realization of higher and higher reductions according to the invention can be seen from the following two numerical examples in which the reduction ratio between the flexible planetary wheel and the hollow wheel or the spur wheel is identified by i1 or i2, respectively:

| I:  | i1 = 1:102 | i2 = −1:100 | i-total = 1:10,200 |
|-----|------------|-------------|--------------------|
| II: | i1 = 1:100 | i2 = −1:130 | i-total = 1:419.   |

Since the two rows of teeth are loaded or stressed by a common drive cam, a common entry curve or radial vector curve is defined. This is calculated from the reduction and from the flank angle as explained above. For the two rows of teeth with varying reductions, the prescribed curve can be determined by changing the flank angle $\alpha$ while taking into account the tooth height, whereby the following equation applies:

$$\operatorname{tg}(\alpha 1/2) : \operatorname{tg}(\alpha 2 /2) = i2 : i1.$$

Based on this significant relationship, the flank angle $\alpha 2/2$ of 15° is determined for a flank angle $\alpha 1/2$ (one-half of $\alpha 1$) of 20°. No correction is necessary for Example I.

The foregoing description and examples have been set forth merely to illustrate the invention and are not intended to be limiting. Since modifications of the described embodiments incorporating the spirit and substance of the invention may occur to persons skilled in the art, the scope of the invention should be limited solely with reference to the appended claims and equivalents.

What is claimed is:

1. A planetary drive comprising an externally toothed sun wheel, a toothed hollow wheel coaxial to said sun wheel; a radially flexible planetary wheel having internal teeth and external teeth and arranged at least partially in an annular gap between said hollow wheel and said sun wheel; a rotatably mounted cam element for radially deforming said planetary wheel in such a way that external teeth on said planetary wheel engage teeth on said hollow wheel and internal teeth on said planetary wheel engage teeth on said sun wheel in a plurality of engagement zones distributed around the circumference of said planetary wheel; and a roller bearing interposed between said cam element and said planetary wheel, wherein the internal teeth and the external teeth of the planetary wheel are arranged in a common axial plane and are connected to circumferentially adjacent teeth by connecting webs having a radial thickness which is less than the combined radial height of the internal teeth and the external teeth of the planetary wheel.

2. A planetary drive comprising an externally toothed sun wheel; a toothed hollow wheel coaxial to said sun wheel; a radially flexible planetary wheel having internal teeth and external teeth and arranged at least partially in an annular gap between said hollow wheel and said sun wheel; a rotatably mounted cam element for radially deforming said planetary wheel in such a way that external teeth on said planetary wheel engage teeth on said hollow wheel and internal teeth on said planetary wheel engage teeth on said sun wheel in a plurality of engagement zones distributed around the circumference of said planetary wheel; and a roller bearing interposed between said cam element and said planetary wheel, wherein said flexible planetary wheel is surrounded by a thin-walled, flexible ring for taking up tensile stresses.

3. A planetary drive according to claim 2, wherein said ring is arranged in a recess in said hollow wheel.

4. A planetary drive comprising an externally toothed sun wheel; a toothed hollow wheel coaxial to said sun wheel; a radially flexible planetary wheel having internal teeth and external teeth and arranged at least partially in an annular gap between said hollow wheel and said sun wheel; a rotatably mounted cam element for radially deforming said planetary wheel in such a way that external teeth on said planetary wheel engage teeth on said hollow wheel and internal teeth on said planetary wheel engage teeth on said sun wheel in a plurality of engagement zones distributed around the circumference of said planetary wheel; and a roller bearing interposed between said cam element and said planetary wheel, wherein said hollow wheel is supported by an elastic element on a solid ring.

5. A planetary drive comprising an externally toothed sun wheel; a toothed hollow wheel coaxial to said sun wheel; a radially flexible planetary wheel having internal teeth and external teeth and arranged at least partially in an annular gap between said hollow wheel and said sun wheel; a rotatably mounted cam element for radially deforming said planetary wheel in such a way that external teeth on said planetary wheel engage teeth on said hollow wheel and internal teeth on said planetary wheel engage teeth on said sun wheel in a plurality of engagement zones distributed around the circumference of said planetary wheel; and a roller bearing interposed between said cam element and said planetary wheel, wherein said planetary wheel is flexible both radially and circumferentially; said planetary wheel being sufficiently flexible in the circumferential direction that the teeth of the planetary wheel can shift circumferentially to accommodate varying effective tooth distributions in the engagement regions.

6. A planetary drive comprising an externally toothed sun wheel; a toothed hollow wheel coaxial to said sun wheel; a radially flexible planetary wheel having internal teeth and external teeth and arranged at least partially in an annular gap between said hollow wheel and said sun wheel; a rotatably mounted cam element for radially deforming said planetary wheel in such a way that external teeth on said planetary wheel engage teeth on said hollow wheel and internal teeth on said planetary wheel engage teeth on said sun wheel in a plurality of engagement zones distributed around the circumference of said planetary wheel; and a roller bearing interposed between said cam element and said planetary wheel, wherein said planetary wheel is flexible both radially and circumferentially and comprises circumferentially alternating, radially inwardly and outwardly projecting tooth portions connected to each other by web-form regions having a circumferential thickness, and each tooth portion has a radial height which is greater than the circumferential thickness of said web-form regions.

7. A planetary drive according to claim 6, wherein the radial height of each tooth portion is at least twice as great as the circumferential thickness of said web-form regions.

8. A planetary drive comprising an externally toothed sun wheel; a toothed hollow wheel coaxial to said sun wheel; a radially flexible planetary wheel having internal teeth and external teeth and arranged at least partially in an annular gap between said hollow wheel and said sun wheel; a rotatably mounted cam element for radially deforming said planetary wheel in such a way that external teeth on said planetary wheel engage teeth on said hollow wheel and internal teeth on said planetary wheel engage teeth on said sun wheel in a plurality of engagement zones distributed around the circumference of said planetary wheel; and a roller bearing interposed between said cam element and said planetary wheel, wherein the teeth of said hollow wheel are constructed with substantially flat tooth flanks and points of the teeth of said hollow wheel are flattened to increase the internal diameter of said hollow wheel, the inner diameter of said hollow wheel substantially corresponding to the outer diameter of peaks of the external teeth of said planetary wheel at a point of maximum engagement between internal teeth of said planetary wheel and teeth of said sun wheel, whereby the peaks of the external teeth of said planetary wheel are disengaged from the teeth of said hollow wheel at said point of maximum engagement between said planetary wheel and said sun wheel, and the amount of deformation of said planetary wheel required to engage with and disengage from said hollow wheel is decreased.

9. A planetary drive comprising an externally toothed sun wheel; a toothed hollow wheel coaxial to said sun wheel; a radially flexible planetary wheel having internal teeth and external teeth and arranged at least partially in an annular gap between said hollow wheel and said sun wheel; a rotatably mounted cam element for radially deforming said planetary wheel in such a way that external teeth on said planetary wheel engage teeth on said hollow wheel and internal teeth on said planetary wheel engage teeth on said sun wheel in a plurality of engagement zones distributed around the circumference of said planetary wheel; and a roller bearing interposed between said cam element and said planetary wheel, wherein the teeth of said sun wheel are constructed with substantially flat tooth flanks and and peaks of teeth of said sun wheel are flattened to decrease the outer diameter of said sun wheel, the outer diameter of said sun wheel substantially corresponding to the inner diameter of peaks of the internal teeth of said planetary wheel at a point of maximum engagement between said planetary wheel and said hollow wheel, whereby the internal teeth of said planetary wheel are disengaged from the teeth of said sun wheel at said point of maximum engagement between said planetary wheel and said hollow wheel, and the amount of deformation of said planetary wheel required to engage with and disengage from said sun wheel is decreased.

* * * * *